United States Patent
Nishi (10) Patent No.: US 10,296,004 B2
(45) Date of Patent: May 21, 2019

(54) AUTONOMOUS OPERATION FOR AN AUTONOMOUS VEHICLE OBJECTIVE IN A MULTI-VEHICLE ENVIRONMENT

(71) Applicant: Toyota Motor Engineering & Manufacturing North America, Inc., Erlanger, KY (US)

(72) Inventor: Tomoki Nishi, Ann Arbor, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 0 days.

(21) Appl. No.: 15/629,004

(22) Filed: Jun. 21, 2017

(65) Prior Publication Data

US 2018/0373245 A1  Dec. 27, 2018

(51) Int. Cl.
| | |
|---|---|
| *G08B 23/00* | (2006.01) |
| *G06G 7/76* | (2006.01) |
| *B60W 50/06* | (2006.01) |
| *G05D 1/00* | (2006.01) |
| *G07C 5/00* | (2006.01) |
| *G05D 1/02* | (2006.01) |
| *G08G 1/16* | (2006.01) |
| *G06N 99/00* | (2019.01) |

(52) U.S. Cl.
CPC ......... *G05D 1/0088* (2013.01); *G05D 1/0221* (2013.01); *G05D 1/0276* (2013.01); *G06N 99/005* (2013.01); *G08G 1/161* (2013.01); *G08G 1/167* (2013.01)

(58) Field of Classification Search
CPC ...... G05D 1/0083; G05D 1/00; G08G 1/0133; G08G 1/04; B60W 50/06; H04L 12/40; G07C 5/008; G08B 23/00; G06G 7/76
See application file for complete search history.

(56) References Cited

U.S. PATENT DOCUMENTS

| | | | |
|---|---|---|---|
| 9,511,767 B1 * | 12/2016 | Okumura | G08G 1/0133 |
| 9,947,145 B2 * | 4/2018 | Wang | G07C 5/008 |
| 2008/0269985 A1 | 10/2008 | Yamada | |

(Continued)

OTHER PUBLICATIONS

Konda et al., "On Actor-Critica Algorithms" 2003 Society for Industrial and Applied Mathematics, vol. 42, No. 4, pp. 1143-1166.

(Continued)

*Primary Examiner* — Yuri Kan
(74) *Attorney, Agent, or Firm* — Christopher G. Darrow; Darrow Mustafa PC (57) ABSTRACT

A device and method for state progression in a set of autonomous vehicle states related to an autonomous vehicle objective for a multi-vehicle environment. A vehicular state of another vehicle of the multi-vehicle environment is discerned to produce a discerned vehicular state of the another vehicle, wherein the another vehicle operates to affect the autonomous vehicle objective. An adaptive policy is formed for a present one of the set of autonomous vehicle states based on the discerned vehicular state, and producing from the adaptive policy an autonomous vehicle action to progress to a subsequent one of the set of autonomous vehicle states. The autonomous vehicle action is transmitted for effecting a progression to the subsequent one of the set of autonomous vehicle states.

20 Claims, 6 Drawing Sheets

(56) References Cited

U.S. PATENT DOCUMENTS

| | | | |
|---|---|---|---|
| 2013/0073192 A1* | 3/2013 | Hota | G08G 1/04 |
| | | | 701/118 |
| 2017/0139411 A1* | 5/2017 | Hartung | H04L 12/40 |
| 2018/0009445 A1* | 1/2018 | Nishi | B60W 50/06 |

OTHER PUBLICATIONS

Balkenius, C. and Winberg, S. (2008). Fast Learning in an Actor-Critic Architecture with Reward and Punishment, In A. Hoist, P. Kreuger and P. Funk (Eds) Tenth Scandinavian Conference on Artificial Intelligence (SCAI 2008) (pp. 20-27). Frontiers in Artificial Intelligence and Applications, 173. IOS Press.
Lei, Huitian, "An Online Actor Critic Algorithm and a Statistical Decision Procedure for Personalizing Intervention" Dissertation 2016, University of Michigan in 108 pages.
Pennesi et al., "A Distributed Actor-Critic Algorithm and Applications to Mobile Sensor Network Coordination Problems" IEEE Transactions on Automatic Control (pp. 1-6) Undated.

* cited by examiner

FIG. 1

FIG. 2
service unit 110

FIG. 3
memory 206

FIG. 4

FIG. 5
multi-vehicle environment 116

FIG. 6

AUTONOMOUS OPERATION FOR AN AUTONOMOUS VEHICLE OBJECTIVE IN A MULTI-VEHICLE ENVIRONMENT

FIELD

The subject matter described herein relates in general to autonomous vehicle operation in a multi-vehicle environment and, more particularly, to autonomous vehicle operation for achieving an autonomous vehicle objective in a multi-vehicle environment.

BACKGROUND

In general, autonomous vehicles have used control system architectures to perform autonomous driving functions to travel a trajectory plan having an origin and a destination. To accomplish the larger objective of traveling from the origin to the destination, the trajectory plan has been parsed into smaller objectives, such as "turn" at a specific landmark, to travel at a speed within a designated limit, etc. Other vehicles, which may not be fully or partially autonomous, have not had the capability to share trajectory plans and/or to otherwise coordinate travel routes with autonomous vehicles on a roadway. A strategy has been to consider these other vehicles as part of a stationary environment relative to the autonomous vehicle - just that the environment changed more frequently. Also, the high sampling and scanning rates for assessing these environments yielded a large data volume to process and access in a time threshold sufficient to effectively allow timely autonomous vehicle decisions. A need exists for a method and device that can optimize autonomous vehicle decision making in a multi-vehicle environment so as to form timely action decisions (such as whether to accelerate, decelerate, etc.) while also taking into account the non-constant, or non-static, operation of other vehicles in the multi-vehicle environment.

SUMMARY

A device and method for an autonomous vehicle operation in a multi-vehicle environment is disclosed. The autonomous vehicle operation provides for an autonomous vehicle objective including a set of autonomous vehicle states, where another vehicle of the multi-vehicle environment affects the autonomous vehicle objective. An autonomous vehicle action is selected for progressing to a subsequent state of the set of autonomous vehicle states, while taking into consideration a discerned vehicular state of the another vehicle, without requiring active scanning and sensing of the multi-vehicle environment by the autonomous operation.

In one implementation, a method is disclosed for state progression in a set of autonomous vehicle states related to an autonomous vehicle objective for a multi-vehicle environment. A vehicular state of another vehicle of the multi-vehicle environment is discerned to produce a discerned vehicular state of the another vehicle, wherein the another vehicle operates to affect the autonomous vehicle objective. An adaptive policy is formed for a present one of the set of autonomous vehicle states based on the discerned vehicular state, and producing from the adaptive policy an autonomous vehicle action to progress to a subsequent one of the set of autonomous vehicle states. The autonomous vehicle action is transmitted for effecting a progression to the subsequent one of the set of autonomous vehicle states.

In another implementation, a vehicle control unit for autonomous vehicle operation in a multi-vehicle environment is disclosed. The vehicle control unit includes a wireless communication interface, a processor, and memory. The wireless communication interface is operable to service communications with a vehicle network. The processor is communicably coupled to the wireless communication interface, and to a plurality of vehicle sensor devices. The memory is communicably coupled to the processor, and storing, for each state progression of a set of autonomous vehicle states for an autonomous vehicle objective, a multi-vehicle detection module and a reinforcement learning module. The multi-vehicle detection module includes instructions, that when executed by the processor, cause the processor to discern, based on a first portion of the plurality of vehicle sensor devices, a vehicular state of another vehicle of the multi-vehicle environment to produce a discerned vehicular state of the another vehicle, wherein the another vehicle operates to affect the autonomous vehicle objective. The reinforcement learning module includes instructions that, when executed by the processor, cause the processor to retrieve passive dynamic data for the autonomous vehicle operation relating the multi-vehicle environment based on a second portion of the plurality of the vehicle sensor devices. The reinforcement learning module forms an adaptive policy, based on the discerned vehicular state and the passive dynamic data, for a present one of a plurality of autonomous vehicle states related to the autonomous vehicle objective. From the adaptive policy, the reinforcement learning module forms an autonomous vehicle action command to progress to a subsequent one of the set of autonomous vehicle states, and transmits the autonomous vehicle action command to effect a progression to the subsequent one of the autonomous vehicle states.

BRIEF DESCRIPTION OF THE DRAWINGS

The description makes reference to the accompanying drawings wherein like reference numerals refer to like parts throughout the several views, and wherein.

DETAILED DESCRIPTION

Autonomous vehicle operations for a multi-vehicle environment for an autonomous vehicle objective are described here. An example method considers whether another vehicle in the multi-vehicle environment affects an autonomous vehicle objective (such as merging with a traffic flow of a lane including the another vehicle). Autonomous vehicle solutions had considered the another vehicle as a component of a stationary, or predictable, vehicle environment relative to the autonomous vehicle. In contrast, the example method and embodiments herein consider the vehicular actions of another vehicle, or vehicles, for forming the vehicle solutions to achieve the vehicle objective.

Figure 1:
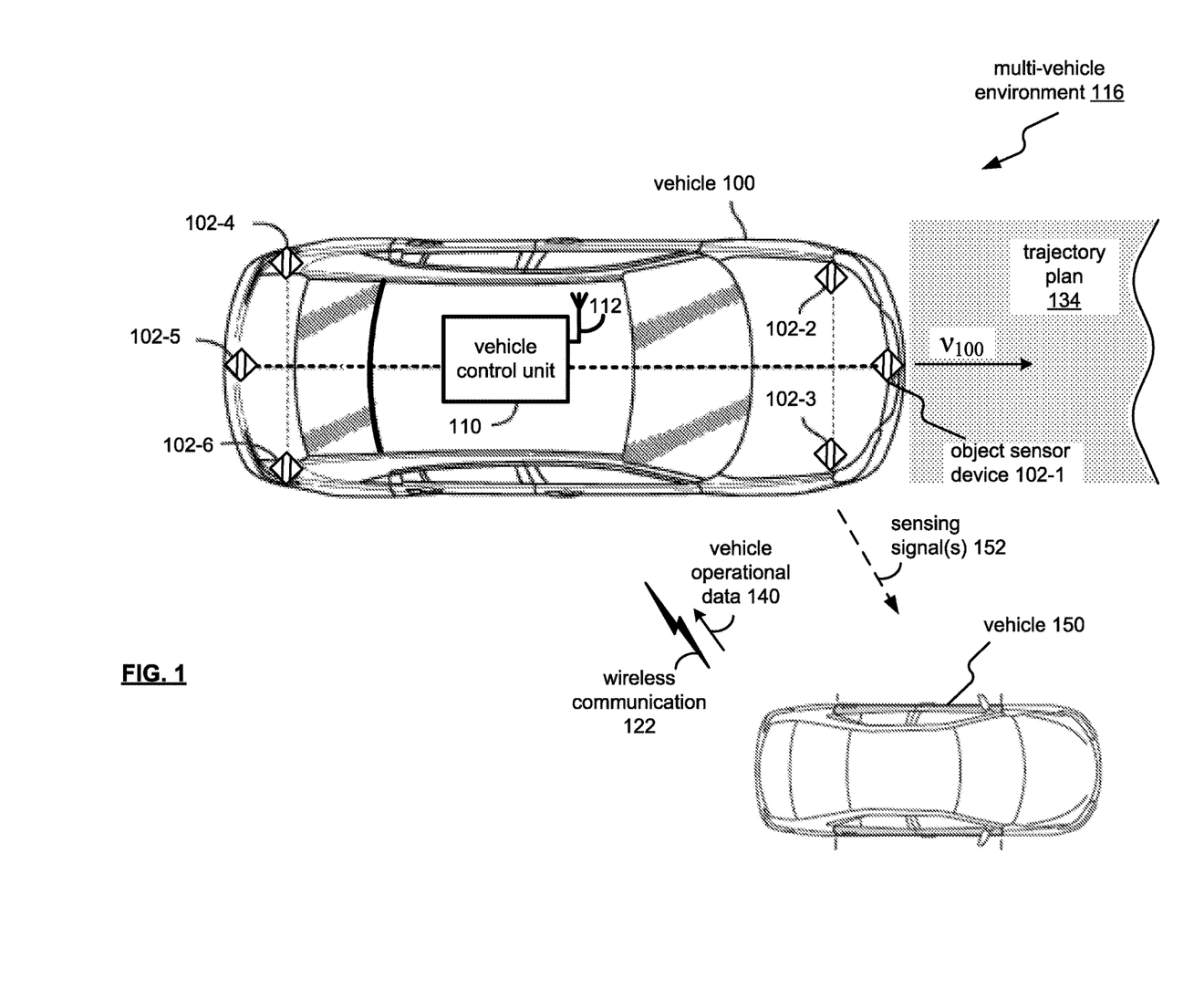
FIG. 1 is a schematic illustration of a vehicle including a vehicle control unit for providing autonomous vehicle operations in a multi-vehicle environment.

FIG. 1 is a schematic illustration of a vehicle 100 including a vehicle control unit 110 for providing autonomous vehicle operations in a multi-vehicle environment 116.

As may be appreciated, the vehicle 100 may be an automobile, light truck, cargo transport, or any other passenger or non-passenger vehicle.

A plurality of object sensor devices 102-1, 102-2, 102-3, 102-4, 102-5 and 102-6 (generally, object sensor devices 102) are in communication with the control unit 110 to assess a multi-vehicle environment 116 in which another vehicle 150 may operate to affect an autonomous vehicle objective with respect to a trajectory plan 134 for the vehicle 100. Trajectory information of the vehicle 100 (and autonomous vehicle states) generally may include the trajectory plan 134, vehicle speed, vehicle make, vehicle model, firmware installation, destination point, and trajectory point operations (such as slowing, stops, turns, accelerations, merging with traffic flows, etc.) at various predetermined markers that may be located on GPS and/or mapping technologies.

Also, trajectory information may include intermediary autonomous vehicle objectives. That is, the vehicle control unit 110 may identify objectives as generally static, such as turns at signals, streets, such as accelerating or decelerating for traffic signal markers, etc. On the other hand, such with a multi-vehicle environment 116, the intermediary autonomous vehicle objective may be dynamic as related to the another vehicle 150. Such an autonomous vehicle objective may include merging by the vehicle 100 into a traffic flow with the another vehicle 150, such as via a merge lane onto a highway, from a present traffic lane to an adjacent traffic lane, from an exit lane to a frontage lane, etc., as is discussed in detail with reference to FIGS. 2-6. For convenience, autonomous interaction may model a behavior of the another vehicle 150 as static and/or constant, disregarding variations in speed and course of the another vehicle 150 and a resulting effect on an intermediate autonomous vehicle objective, such as a traffic merge.

The plurality of object sensor devices 102 may be positioned on the outer surface of the vehicle 100, or may be positioned in a concealed fashion for aesthetic purposes with regard to the vehicle 100. Communication between object sensor devices 102 and vehicle control units, including vehicle control unit 110, may be on a bus basis, and may also be used or operated by other systems of the vehicle 100.

For example, the object sensor devices 102 may be coupled by a combination of network architectures such as a Body Electronic Area Network (BEAN), a Controller Area Network (CAN) bus configuration, an Audio Visual Communication-Local Area Network (AVC-LAN) configuration, and/or other combinations of additional communication-system architectures to provide communications between devices and systems of the vehicle 100.

Outputs of the example object sensor devices 102 may be used by the vehicle control unit 110 to determine via sensing signal(s) 152 whether another vehicle of the multi-vehicle environment 116 affects an autonomous vehicle object. When so, the object sensor devices 102 may discern, via sensing signal(s) 152, a vehicular state of the another vehicle 150 with reference to the vehicle 100.

The object sensor devices 102 may be provided by a Light Detection and Ranging (LIDAR) system, in which the object sensor devices 102 may capture data related laser light returns from physical objects in the environment 116 of the vehicle 100. The object sensor devices 102 may also include a combination of lasers (LIDAR) and milliwave radar devices. LIDAR and radar based devices may operate to sense objects along with a velocity (that is, relative and/or absolute velocities) of objects.

The object sensor devices 102 may, alone or in combination, operate to capture depth images or otherwise generating depth information for a captured image. For example, the object sensor devices 102 may configured to capture images (visual and non-visual spectrum wavelengths, audible and non-audible wavelengths, etc.).

In this respect, the object sensor devices 102 are operable to determine distance vector measurements of the another vehicle 150 of the multi-vehicle environment 116 via sensing signal(s) 152.

For example, each of the object sensor devices 102 may be configured to sense and/or analyze structured light, time of flight (e.g., of signals for Doppler sensing), light detection and ranging (LIDAR), light fields, and other information to determine depth/distance, direction and/or velocity of the another vehicle 150.

In operation, objects may be detected using multiples of the sensors 102-1 through 102-6 in combination or independently. In one example, object sensor devices 102-1, 102-2, and 102-3 may operate to detect objects ahead of the vehicle 100, and object sensor devices 102-4, 102-5 and 102-6 may operate to detect objects behind the vehicle 100.

Also, each of the object sensor devices 102 may implement respective functions to provide a collective object parameter detection based on respective spatial portions. For example, object sensor device 102-1 may operate to detect an object such as the another vehicle 150, and object sensor device 102-2 may operate to detect an object velocity of the another vehicle 150 relative to the vehicle 100. Further, object sensor device 102-3 may operate in combination with object sensor device 102-1 to corroborate a sensing and/or detection of an object such as the another vehicle 150. As may be appreciated, an object's velocity may be determined via an object sensor device 102, may be extrapolated by successive position detection measurements of the object, and calculating speed and/or direction of motion based thereon (such as to form a motion vector).

Also, respective subsets of object sensor devices 102 may operate in combination with other subsets of object sensor devices, and may also operate in an alternately or asynchronously, simultaneously, or individually based manner for a desired sensing function and/or application.

In operation, the vehicle control unit 110 may operate to receive vehicle sensor data that can be output by object sensor devices 102. The object sensor devices 102 may capture and send vehicle sensor data related to laser returns from physical objects in the area surrounding the vehicle 100 while traveling at a velocity $V_{100}$, along a trajectory plan 134. As an example, signal returns of the sensing signal(s) 152 may indicate vehicle route markings, such as a center line, lane lines, and edges of the vehicle route 134, traffic signage, etc., as well as the another vehicle 150.

As may be appreciated, the vehicle control unit 110 may operate to select an autonomous vehicle objective for a multi-vehicle environment 116. The autonomous vehicle objective may be based on the trajectory plan 134 and/or short-term autonomous control by the vehicle control unit 110. With respect to the autonomous vehicle objective, the vehicle control unit 110 may identify a set of autonomous vehicle states, and determine whether another vehicle 150 of the multi-vehicle environment affects the autonomous vehicle objective.

When the another vehicle 150 of the vehicle environment 116 affects the autonomous vehicle objective, the vehicle control unit 110 operates to progress through the set of autonomous vehicle states to achieve the autonomous vehicle object, while also accounting for the discerned vehicular states of the another vehicle 150. The vehicle control unit 110 may operate to form an adaptive policy to a present one of the set of autonomous vehicle states for the vehicle 100, and based on the discerned vehicular state of the another vehicle 150. The adaptive policy forms an autonomous vehicle action to progress to a subsequent one of the set of autonomous vehicle states of the vehicular objective. The vehicle control unit 110 may transmit the vehicular action for effecting a progression to the subsequent one of the set of autonomous vehicle states. By recursively progressing through the set of vehicle states in such a manner, the vehicle control unit 110 may satisfy the autonomous vehicle objective in the multi-vehicle environment 116, as discussed in detail with reference to FIGS. 2-6.

Figure 2:
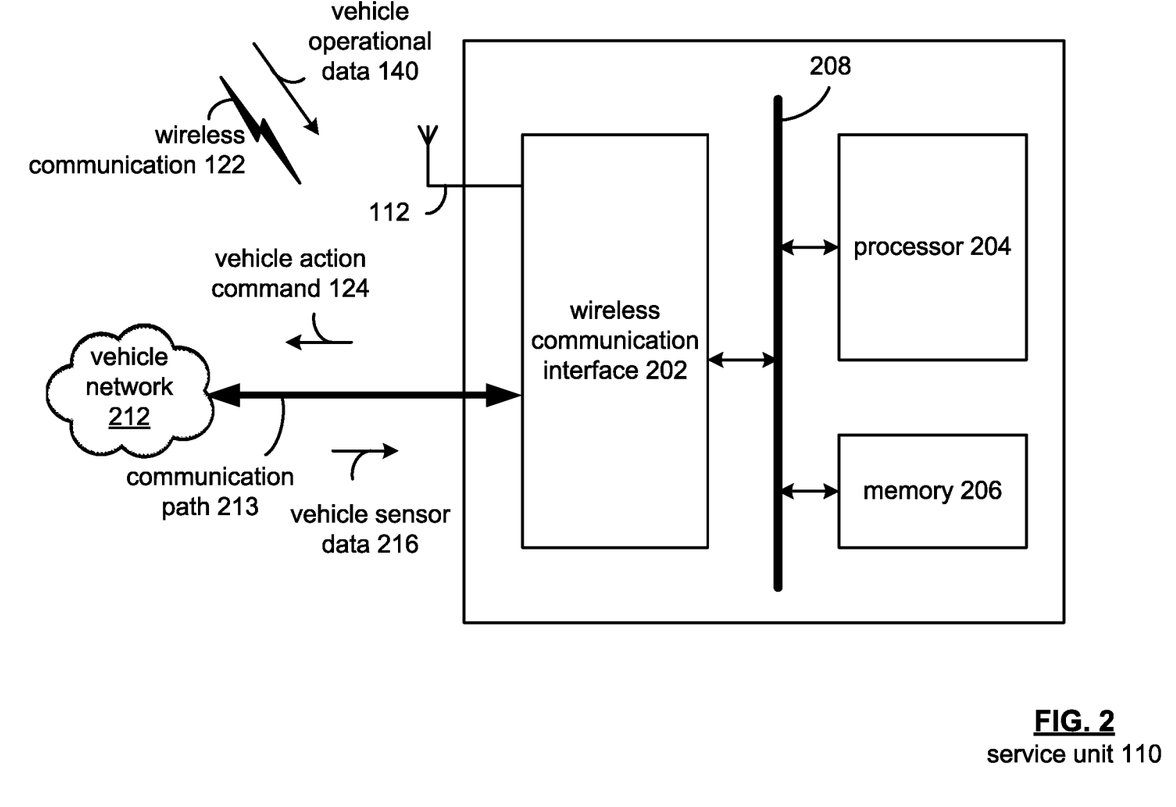
FIG. 2 illustrates a block diagram of the vehicle control unit of FIG. 1.

FIG. 2 illustrates a block diagram of a vehicle control unit 110 of FIG. 1. FIG. 2 is a block diagram of a vehicle control unit 110, which includes a wireless communication interface 202, a processor 204, and memory 206, that are communicably coupled via a bus 208. The vehicle control unit 110 may provide an example platform for the device and methods described in detail with reference to FIGS. 1-6.

The processor 204 can be a conventional central processing unit or any other type of device, or multiple devices, capable of manipulating or processing information. As may be appreciated, processor 204 may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions.

The memory (and/or memory element) 206 may be communicably coupled to the processor 204, and may operate to store one or more modules described herein. The modules can include instructions that, when executed, cause the processor 204 to implement one or more of the various processes and/or operations described herein.

The memory and/or memory element 206 may be a single memory device, a plurality of memory devices, and/or embedded circuitry of the processor 204. Such a memory device may be a read-only memory, random access memory, volatile memory, non-volatile memory, static memory, dynamic memory, flash memory, cache memory, and/or any device that stores digital information. Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device. Program code embodied on a computer-readable medium may be transmitted using any appropriate medium, including but not limited to wireless, wireline, optical fiber, cable, RF, etc., or any suitable combination of the foregoing.

The memory 206 is capable of storing machine readable instructions, or instructions, such that the machine readable instructions can be accessed by the processor 204. The machine readable instructions can comprise logic or algorithm(s) written in programming languages, and generations thereof, (e.g., 1GL, 2GL, 3GL, 4GL, or 5GL) such as, for example, machine language that may be directly executed by the processor 204, or assembly language, object-oriented programming (OOP) such as JAVA, Smalltalk, C++ or the like, conventional procedural programming languages, scripting languages, microcode, etc., that may be compiled or assembled into machine readable instructions and stored on the memory 206. Alternatively, the machine readable instructions may be written in a hardware description language (HDL), such as logic implemented via either a field-programmable gate array (FPGA) configuration or an application-specific integrated circuit (ASIC), or their equivalents. Accordingly, the methods and devices described herein may be implemented in any conventional computer programming language, as pre-programmed hardware elements, or as a combination of hardware and software components.

Note that when the processor 204 includes more than one processing device, the processing devices may be centrally located (e.g., directly coupled together via a wireline and/or wireless bus structure) or may be distributed located (e.g., cloud computing via indirect coupling via a local area network and/or a wide area network). Further note that when the processor 204 implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry.

Still further note that, the memory 206 stores, and the processor 204 executes, hard coded and/or operational instructions of modules corresponding to at least some of the steps and/or functions illustrated in FIGS. 1-6.

The vehicle control unit 110 can include one or more modules, at least some of which are described herein. The modules can be implemented as computer-readable program code that, when executed by a processor 204, implements one or more of the various processes described herein. One or more of the modules can be a component of the processor(s) 204, or one or more of the modules can be executed on and/or distributed among other processing systems to which the processor(s) 204 is operatively connected. The modules can include instructions (e.g., program logic) executable by one or more processor(s) 204.

The wireless communication interface 202 generally governs and manages the data received via a vehicle network 212. There is no restriction on the present disclosure operating on any particular hardware arrangement and therefore the basic features herein may be substituted, removed, added to, or otherwise modified for improved hardware and/or firmware arrangements as they may develop.

The antenna 112 may include one or more conductive elements that interact with electromagnetic signals transmitted by global positioning system satellites. The received signals may be transformed into a data signal indicative of the location (for example, latitude and longitude positions), and further indicative of the positioning of the vehicle with respect to road data.

The vehicle control unit 110 may be communicatively coupled to receive signals from global positioning system satellites, such as via the antenna 112 of the vehicle control unit 110, or other such vehicle antennae (not shown). The antenna 112 operates to provide communications with the vehicle control unit 110 through wireless communication 122. As may be appreciated, the wireless communication 122 may operate to convey vehicle-to-vehicle (V2V) communications, vehicle-to-infrastructure (V2I) communications, and/or data/cellular communications, to receive vehicle operational data 140 that may relate to the another vehicle 150 (FIG. 1).

The wireless communication 122 may be based on one or many wireless communication system specifications. For example, wireless communication systems may operate in accordance with one or more standards specifications including, but not limited to, 3GPP (3rd Generation Partnership Project), 4GPP (4th Generation Partnership Project), 5GPP (5th Generation Partnership Project), LTE (long term evolution), LTE Advanced, RFID, IEEE 802.11, Bluetooth, AMPS (advanced mobile phone services), digital AMPS, GSM (global system for mobile communications), CDMA (code division multiple access), LMDS (local multi-point distribution systems), MMDS (multi-channel-multi-point distribution systems), IrDA, Wireless USB, Z-Wave, Zig-Bee, and/or variations thereof.

As may be appreciated, the communication path 213 of the vehicle network 212 may be formed from a medium suitable for transmitting a signal such as, for example, conductive wires, conductive traces, optical waveguides, or the like. Moreover, the communication path 213 can be formed from a combination of mediums capable of transmitting signals.

In one embodiment, the communication path 213 may include a combination of conductive traces, conductive wires, connectors, and buses that cooperate to permit the transmission of electrical data signals to components such as processors, memories, sensors, input devices, output devices, and communication devices.

Accordingly, the communication path 213 may be provided by a vehicle bus, or combinations thereof, such as for example, a Body Electronic Area Network (BEAN), a Controller Area Network (CAN) bus configuration, an Audio Visual Communication-Local Area Network (AVC-LAN) configuration, a Local Interconnect Network (LIN) configuration, a Vehicle Area Network (VAN) bus, and/or other combinations of additional communication-system architectures to provide communications between devices and systems of the vehicle 100.

The term "signal" may be understood to relate to a waveform (e.g., electrical, optical, magnetic, mechanical or electromagnetic), such as DC, AC, sinusoidal-wave, triangular-wave, square-wave, vibration, and the like, capable of traveling through at least some of the mediums described herein.

Respective modules of the vehicle control unit 110, and associated instructions, when executed by the processor 204, cause the processor 204 to receive vehicle sensor data 216 from object sensor device(s) 102 (FIG. 1), and produce, at least based in part on the vehicle sensor data 216, an autonomous vehicle action command 124, as is discussed in detail with reference to FIGS. 3-6.

Figure 3:
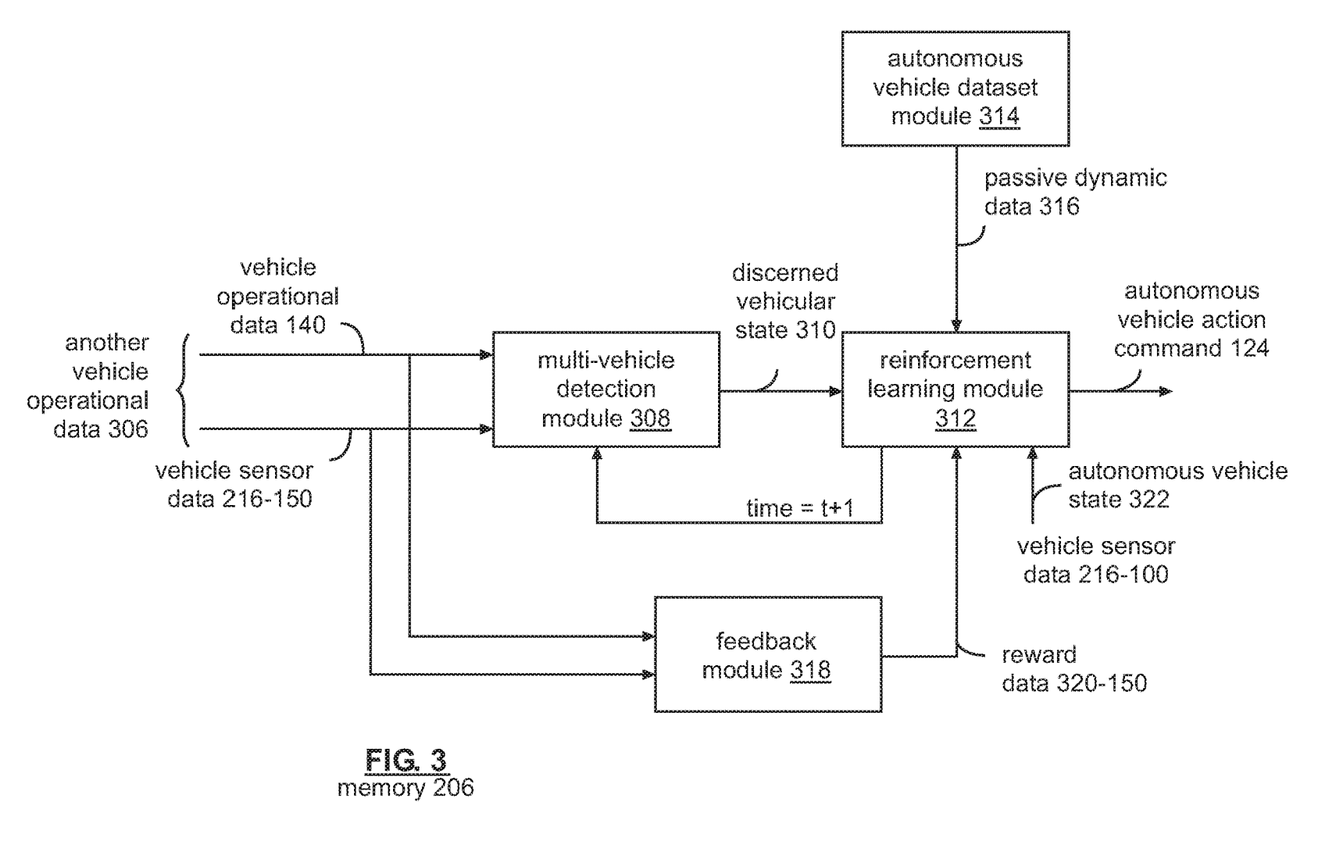
FIG. 3 illustrates a functional module block diagram with a reinforcement learning structure for autonomous vehicle operation in a multi-vehicle environment.

FIG. 3 illustrates a functional module block diagram stored in a memory 206 for the vehicle control unit 110, where memory 206 may store a multi-vehicle detection module 308 and a reinforcement learning module 312. The memory 206 may also store a feedback module 318, and an autonomous vehicle dataset module 314.

The vehicle detection module 308 may receive operational data 306 for another vehicle. The operational data 306 may be based on vehicle operational data 140 transmitted by the another vehicle, and/or vehicle sensor data 216-150, which relates to observation of the another vehicle 150 (FIG. 1) (for example, object sensor device(s) 102 data outputs). With respect to data relating to an autonomous vehicle state 322 for the vehicle 100, vehicle sensor data 216-100 relates to vehicle sensor data 216 relating to operation of the vehicle 100 (for example, vehicle speed sensor (VSS) data output, inertial measurement unit (IMU) data output, etc.).

Based on the operational data 306, the multi-vehicle detection module 308, via instructions that when executed by the processor, cause the processor to discern a vehicular state of the another vehicle of the multi-vehicle environment to produce a discerned vehicular state of the another vehicle, which may operate to affect an autonomous vehicle objective. For example, when the autonomous vehicle objective may be to merge with a traffic flow (such as onto a roadway and/or freeway), the another vehicle may affect the autonomous vehicle objective because when the autonomous vehicle does not factor that vehicle's operational state, a collision and/or evasive action may need to occur. In this respect, the objective of the merge may be a safe transition into the flow, with sufficient autonomous vehicle spacing and without collision with the another vehicle (or other vehicles generally).

The reinforcement learning module 312 receives the discerned vehicular state 310, and an autonomous vehicle state 322 based on vehicle sensor data 216-100 relating to an autonomous vehicle 100. As may be appreciated, reinforcement learning structures had relied on actively sampling an environment to generate control dynamics to base an autonomous vehicle action command 124. The exploration cost may be excessive, and as a result unacceptable for an autonomous vehicle to optimistically attempt maneuvers that may lead to a collision or near-miss because of the time and processing and sampling overhead to arrive at a timely action decision.

Accordingly, the reinforcement learning module 312 may access an autonomous vehicle dataset module 314 to retrieve passive dynamic data. The autonomous vehicle dataset module 314 operates to sample, develop, and store in the memory 206 a partially-known system dynamics model relating to the vehicle 100. The model includes (a) control dynamics data and (b) passive environmental dynamics data. The control dynamics data corresponds with autonomous control (speed parameter, direction parameter, acceleration parameter, deceleration parameter, etc.) of the vehicle 100. The environmental dynamics data (such as average speed on roadway, past interaction/simulation with another vehicle 150, weather conditions in the environment, etc.), may be passive in that the environmental dynamics data not being actively collected, may instead be based on previously collected and stored state transition and/or simulation data corresponding with the autonomous vehicle 100.

In this manner, environmental dynamics data may relate to a road portion of a trajectory plan 134 based on position-and-vector data associated with the vehicle 100, and to position-and-vector data associated with the another vehicle 150 via the discerned vehicular state 310.

Feedback module 318 receives another vehicle operational data 306, based on vehicle operational data 140 and/or vehicle sensor data 216-150, and determines reward data 320-150 relating to the results of the autonomous vehicle action command 124. Further reward, or reinforcement, may be determined based on the autonomous vehicle state 322 in relation to vehicle sensor data 216-100.

Figure 4:
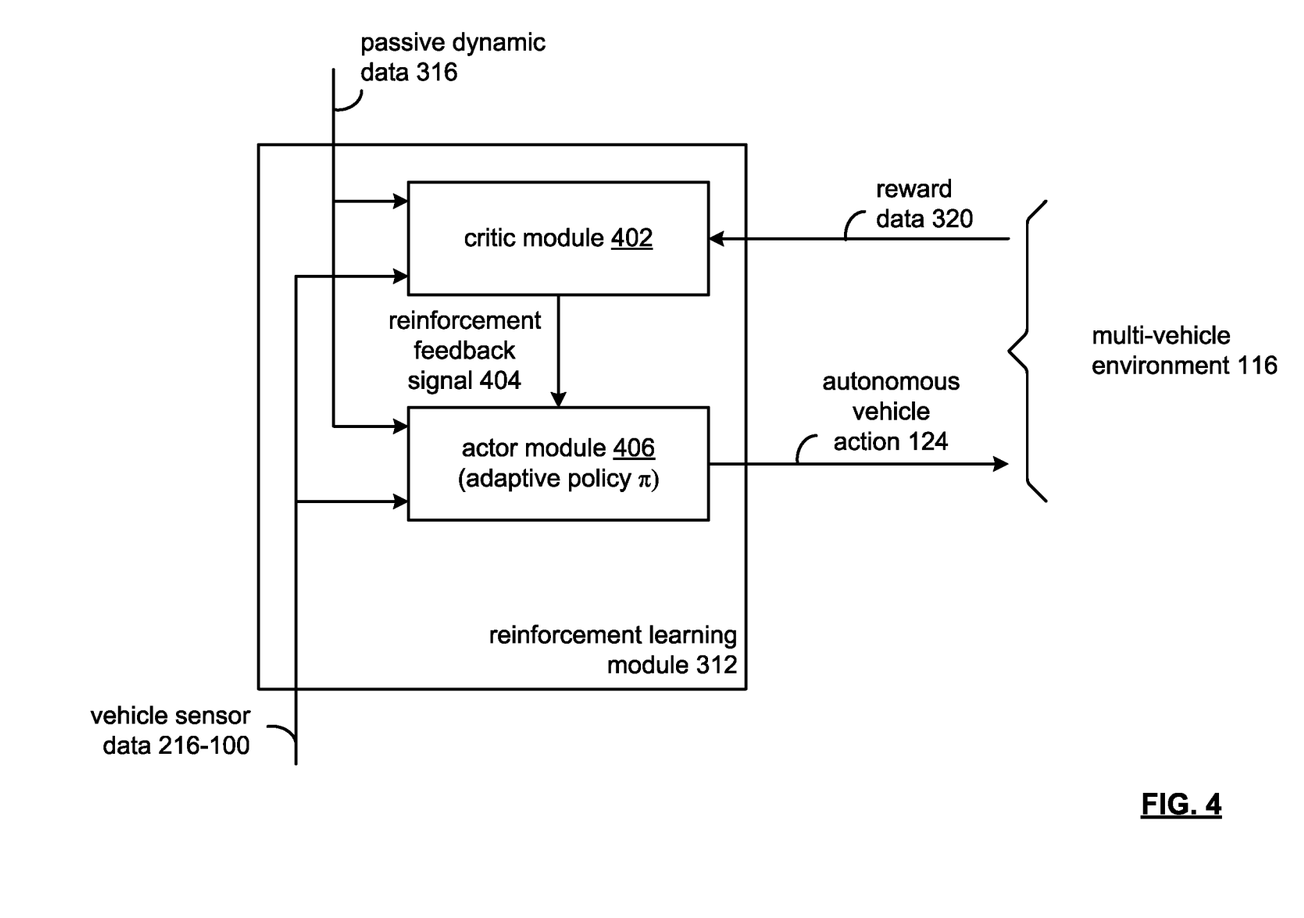
FIG. 4 illustrates a functional module block diagram of an example of a reinforcement learning module of FIG. 3.

FIG. 4 illustrates a functional module block diagram of an example of a reinforcement learning module 312 of FIG. 3. As may be appreciated, reinforcement learning (RL) is a form of machine learning, and may be considered as an aspect of Artificial Intelligence (AI). An objective of reinforcement learning module 312 is to predict state values following a policy decision, and to change the policy towards achieving an optimal policy.

The reinforcement learning module 312 may include a critic module 402 and an actor module 406. The critic module 402 operates to provide state evaluation by generating a reinforcement feedback signal 404, which may be based on observing consequences of the autonomous vehicle action 124 via reward data 320 and the vehicle sensor data 216-100. As may be appreciated, the critic module 402 may take the form of a temporal difference error, which gives indications as to whether an action has gone better or worse than expected with a preceding autonomous vehicle action 124. When the temporal difference is positive, the tendency towards selecting that autonomous vehicle action 124 would be strengthened. As a general example of reward data, a positive reward may indicate successfully following a desired trajectory, while a negative reward may indicate a collision (or not successfully following a desired trajectory).

The actor module 406 may operates to provide a policy π improvement, and may include a policy π component including the agent module behavior function, a value function of how "good" an autonomous vehicle action 124 may be expected to perform (that is, the future reward), and model representation of the multi-vehicle environment 116. The policy π may be considered as the vehicle's behavior as may be mapped from an autonomous vehicle state to an autonomous vehicle action 124. As may be appreciate, the policy π may be a deterministic policy (for example, action "a" equals π (state "s")), or may be a stochastic policy where the policy π (action "a"|state "s") equals probability P [$A_t$=action "a" 124|$S_t$=state "s"] for the next autonomous vehicle state in a Markov progression.

The actor module 406 may be considered as Markovian, in which the future of the autonomous operation depends on a current state (position, speed, direction, etc.), and the autonomous vehicle action 124. A Markov Decision Process defined by {S, A, ρ, r, γ}, where S is set of states, A(s) set of actions possible in state S, ρ is probability of transition from a state S, r is expected reward when executing autonomous vehicle action A at a State S, and γ is discount rate for the expected reward r.

As noted, in a passive actor-critic structure for the reinforcement learning module 312, two data sources, one being the passive dynamic data 316 collected on passive state transitions (that is, sampled and/or simulated vehicle action in relation to the environment 116), and known control dynamics for the autonomous vehicle 100. As may be applied to a linearly-solvable continuous Markov Decision Process (L-MDP), the critic module 402 may estimate an estimated value functions based on a linearized Bellman equation from the passive dynamic data 316, while the actor module 406 may operate to optimize a policy π (producing autonomous vehicle action 124) based on a standard Bellman equation on the passive dynamic data 316 and a control dynamics model for the autonomous vehicle 100.

Figure 5:
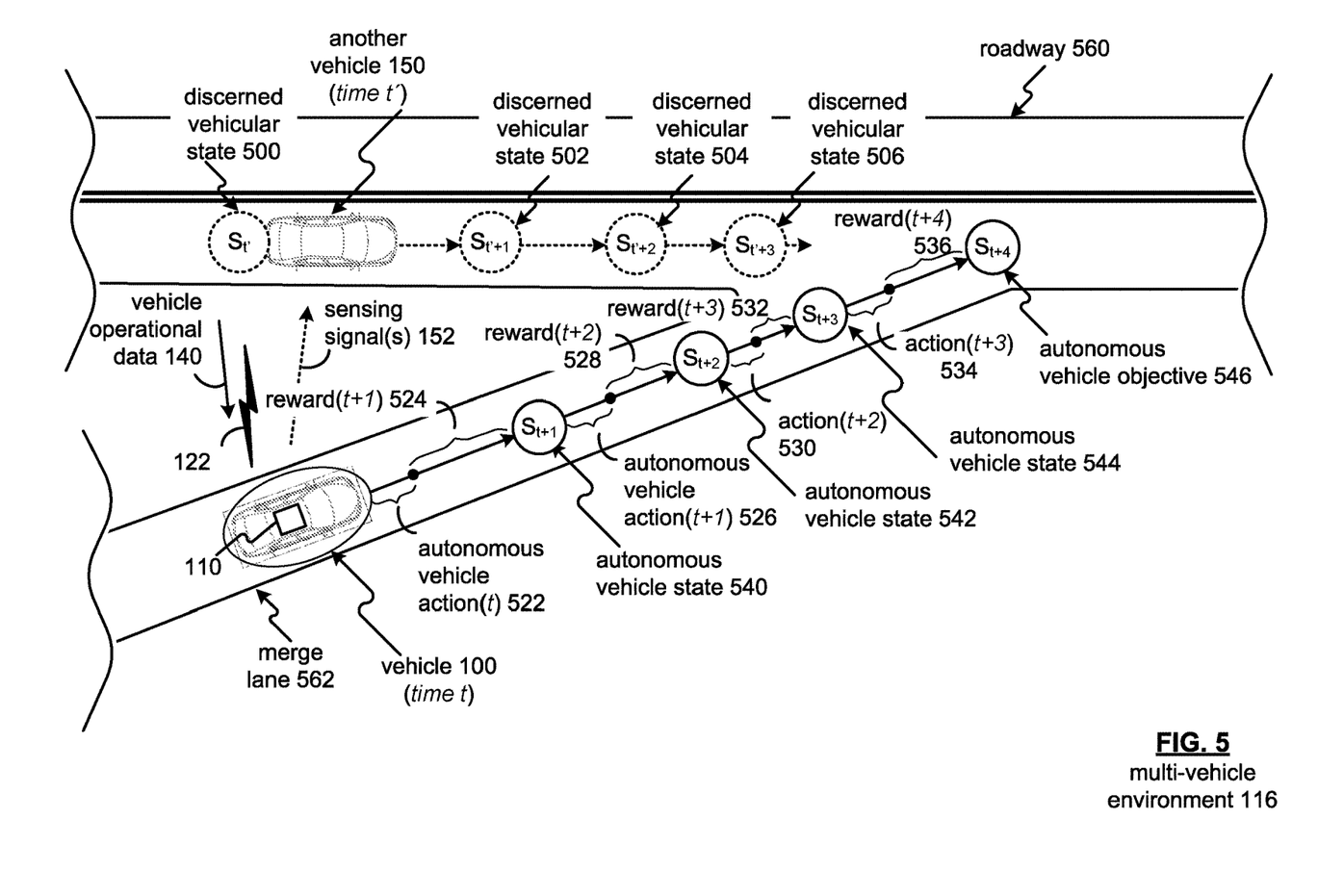
FIG. 5 illustrates an example of a multi-vehicle environment including a vehicle having autonomous operation functionality and another vehicle.

FIG. 5 illustrates an example of a multi-vehicle environment 116 including a vehicle 100 and another vehicle 150. The vehicle 100 selects an autonomous vehicle objective 546, and identifies a set of autonomous vehicle states 540, 542, 544, and 546, relating to the autonomous vehicle objective, which for the present example is to merge the vehicle 100 with the traffic flow of roadway 560. The autonomous vehicle states 540, 542, 544, and 546, may be indicated by a discrete sampling interval by the vehicle control unit 110, and generally selected so as to avoid under sampling and/or oversampling the progression of the vehicle 100 towards the autonomous vehicle objective 546. As may be appreciated, the number of autonomous vehicle states may increase/decrease based upon the discrete sampling interval.

With respect to a passive actor-critic structure of the reinforcement learning module 312 (FIG. 4), passive dynamic data 316 allows for an optimal policy π (that is, increasing speed over a given distance to merge from a merge lane 562 with a traffic flow of a roadway 560) by the autonomous vehicle 100. In this example, an optimal policy π is not based on an active exploration of the multi-vehicle environment 116 to identify each of the physical characteristics for the autonomous vehicle objective 546—that is, merging with a flow of traffic (such as the length of the merge lane 562, the average speed for the merge lane 562, the speed to accelerate to effect a merge with the traffic flow of the roadway 560, etc.). Instead, these characteristics have been collected passively and/or simulated to render an environmental model for use by the reinforcement learning module 312 of the vehicle control unit 110, reducing time otherwise allotted for environment and/or situation assessment.

The another vehicle 150 is determined, via the vehicle control unit 110 of the vehicle 100, to affect the autonomous vehicle objective 546, because the another vehicle 150 may intercept the autonomous vehicle objective 546 at or about the time of the vehicle 100. In this respect, a possibility of a collision and/or near-miss between the vehicle 100 and the another vehicle 150 may result.

As may be appreciated, other example scenarios may occur where another vehicle 150 affects an autonomous vehicle objective of an autonomous vehicle 100, such as merging from a present traffic lane to an adjacent traffic lane including the another vehicle, merging from an exit lane to a frontage lane including the another vehicle, etc. Also, for simplicity of the example, one vehicle 150 is shown to affect an autonomous vehicle objective. In heavier traffic flow conditions, several other vehicles may affect an autonomous vehicle objective, and further sensing and discerning of vehicle states for additional other vehicles may be implemented to adjust the approach of autonomous vehicle 100 towards an autonomous vehicle objective 546.

In operation, the vehicle control unit 110 may generate discerned vehicular states 502, 504, 506, . . . etc., based on sensing signal(s) 152 (and their respective returns) and/or vehicle operational data 140 (such as position, speed, heading, etc.) of the another vehicle 150 relative to the vehicle control unit 110) received by the vehicle control unit 110 via a wireless communication 122. In this respect, the vehicle control unit 110 may operate to take into consideration the movement of the another vehicle 150 on an iterative basis in forming an adaptive policy π to form an autonomous vehicle action (e.g., level of acceleration (m/s$^2$)) to progress to a subsequently autonomous vehicle state 540 towards the autonomous vehicle objective 546.

In operation, the vehicle control unit 110 may discern the vehicular state of the another vehicle 150 to produce a discerned vehicular state. The discerned vehicular states of the another vehicle 150 may be based on another discrete time interval. The vehicle control unit 110 for forms an adaptive policy π to a present autonomous vehicle state at time t relative to the discerned vehicular state S at a time t' of the another vehicle 150. From the adaptive policy π, an autonomous vehicle action(t) 522 is produced to progress from the present autonomous vehicle state at time t to a subsequent one of the set of autonomous vehicle states S at time t+1. For clarity, the autonomous vehicle action may relate to the velocity of the autonomous vehicle based on an adaptive policy π that may be based on a relative velocity of the autonomous vehicle 100 with the another vehicle 150 sufficient to merge from the merge lane 562 to the roadway 560.

The autonomous vehicle action (t) 522 may be transmitted for effecting the progression to the subsequent one of the set of autonomous vehicle states. That is, the autonomous vehicle action (t) 522 may be provided to other vehicle control units of the autonomous vehicle 100, such as a powertrain control unit, which may operate to produce control data based on autonomous vehicle action(t) 522, autonomous vehicle action ($t_1$) 526, autonomous vehicle action (t+2) 530, etc., to vehicle powertrain actuators.

As may be appreciated, other vehicle control units of the vehicle 100 may have similar structures such as the vehicle control unit 110 (FIG. 2). Also, the term "powertrain" as used herein describes vehicle components that generate power and deliver the power to the road surface, water, or air, and may include the engine, transmission, drive shafts, differentials, and the final drive communicating the power to motion (for example, drive wheels, continuous track as in military tanks or caterpillar tractors, propeller, etc.). Also, the powertrain may include steering wheel angle control, either through a physical steering wheel of the vehicle 100, or via drive-by-wire and/or drive-by-light actuators.

As shown in FIG. 5, a progression to a subsequent state of the set of autonomous vehicle states includes an autonomous vehicle action portion related to a present time (t), and a perceived value or reward portion at a future time interval (t +1) relative to the subsequent autonomous vehicle state (for example, a reward (t+1) for autonomous vehicle state 540 at $S_{t+1}$). In a reinforcement learning structure based on passive actor-critic modules (FIG. 4), a critic module 402 may operate to evaluate the perceived reward 524 to determine whether it was achieved, and further adapt a policy π of the actor module 406 (FIG. 4) as appropriate via reinforcement feedback signal 404.

Accordingly, for progressing to subsequent autonomous vehicle state 542 from autonomous vehicle state 540, with a discerned vehicular state 502 (e.g., change in distance x of the another vehicle 150 from time t' to time (t'+1), and velocity $v_{t'+1}$ m/s), the autonomous vehicle 100 implements autonomous vehicle action (t+1) 526 (e.g., acceleration $a_{t+1}$ m/s$^2$) with a perceived reward (t+2) 528 (e.g., distance $d_{t+1}$ meters ahead or behind of the another vehicle 150)).

For progressing to subsequent autonomous vehicle state 544 from autonomous vehicle state 542, with a discerned vehicular state 504 (e.g., change in distance x of the another vehicle 150 from time (t'+1) to time (t'+2), and velocity $v_{t'+2}$ m/s), the autonomous vehicle 100 implements autonomous vehicle action (t+2) 530 (e.g., acceleration $a_{t+2}$ m/s$^2$) with a perceived reward (t+3) 528 (e.g., distance $d_{t+2}$ meters ahead or behind of the another vehicle 150)).

For progressing to subsequent autonomous vehicle state (and autonomous vehicle objective) 546 from autonomous vehicle state 544, with respect to discerned vehicular state 506 (e.g., change in distance x of the another vehicle 150 from time (t'+2) to time (t'+3), and velocity $v_{t'+3}$ m/s), the autonomous vehicle 100 implements autonomous vehicle action (t+3) 534 (e.g., acceleration $a_{t+3}$ m/s$^2$) with a perceived reward (t+4) 536 (e.g., distance $d_{t+4}$ meters ahead or behind of the another vehicle 150)).

As may be appreciated, the autonomous vehicle action from one autonomous vehicle state 540, 542, 544, and 546, may be dissimilar to one another. Also, the velocity and/or acceleration of the another vehicle 150 may not be constant from a discerned vehicular state $S_{t'}$ through discerned vehicular state and initial time t'.

Figure 6:
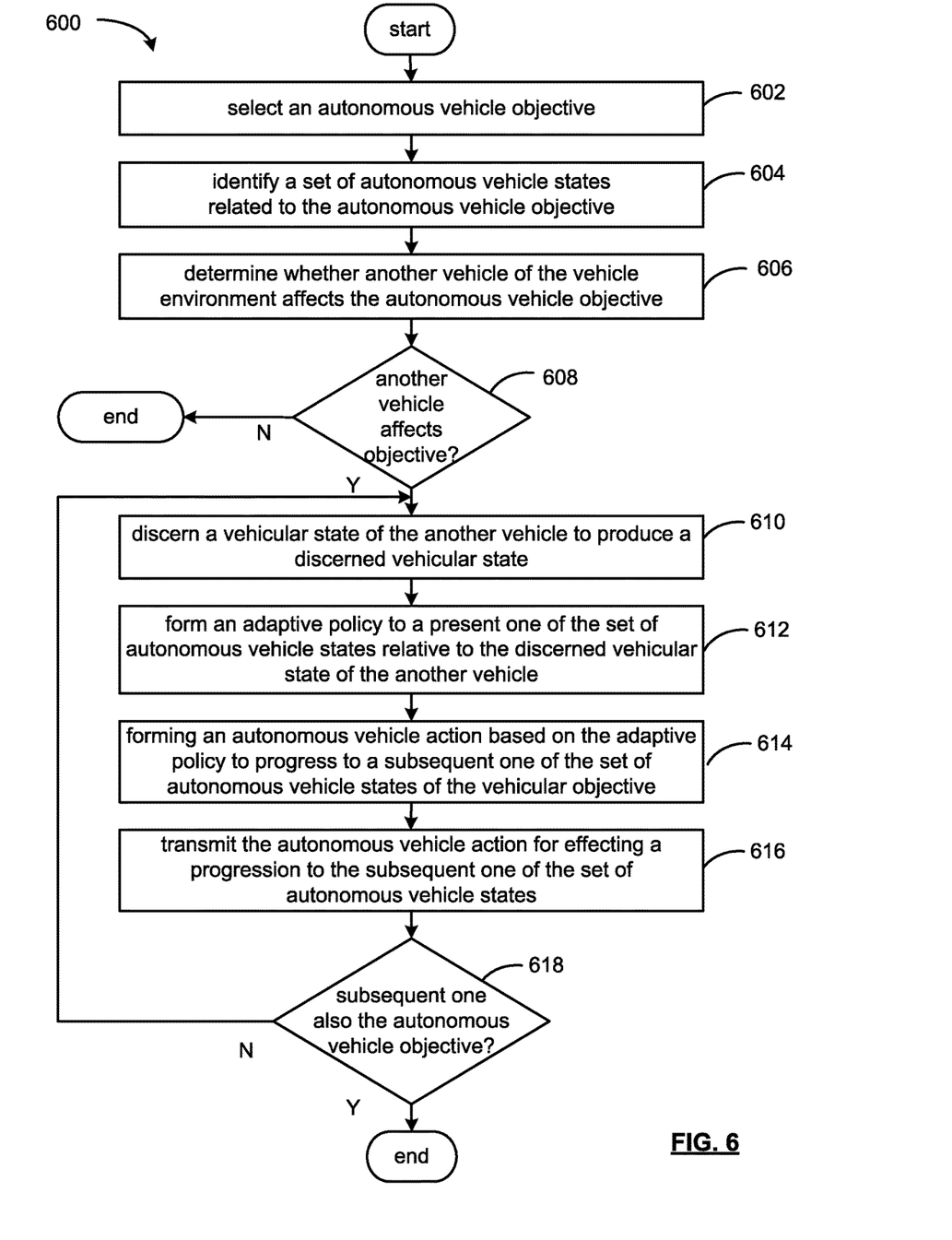
FIG. 6 illustrates an example process for an autonomous operation to progress to an autonomous vehicle objective in a multi-vehicle environment.

FIG. 6 illustrates an example process 600 for an autonomous operation to progress to an autonomous vehicle objective in a multi-vehicle environment. FIG. 6 is an example process 600 for progressing to an autonomous vehicle objective in a multi-vehicle environment.

At operation 602, an autonomous vehicle objective for a vehicle environment is selected, and identifying at operation 604 a set of autonomous vehicle states related to the autonomous vehicle objective. The autonomous vehicle states may be considered as discrete time intervals and/or period for assessing progression to the autonomous vehicle objective. An example of an autonomous vehicle objective may be merging from an access lane onto a traffic flow of a main roadway, merging from a present traffic lane to an adjacent traffic lane including the another vehicle, merging from an exit lane to a frontage lane including the another vehicle, etc.

At operation 606, a determination is made as to whether another vehicle of the vehicle environment affects the autonomous vehicle objective. For example, in a static environment assumption, an autonomous vehicle does not take into account movement of other objects and/or vehicles to completing the objective. In some instances, this assumption may be valid, as when other vehicles and/or objects are a sufficient distance away, and the likelihood that they could interfere with an autonomous vehicle operation may be negligible.

When another vehicle affects the autonomous vehicle objective at operation 608, the methods and devices discussed herein account for the variable introduced by such another vehicle, and through the adaptive policy π, select an autonomous vehicle action taking into consideration the another vehicle and progressing to the autonomous vehicle objective.

In congested scenarios, such as those that may be encountered by merging onto roadways, for example, the effect by another vehicle on the autonomous vehicle objective would likely not be negligible. Moreover, because actor-critic control structures have relied on active present scanning/sampling of an environment, dynamic environments may tend to overwhelm a vehicle control unit to sample and assess the environment in a timely fashion. Generally, action decisions may fall outside a permissible time window for an autonomous vehicle to interact with the vehicle environment.

Accordingly, with a passive actor-critic structure, optimized and/or adaptive policies π may be developed based on environment samples collected on a passive and stored basis, which may be recalled in similar environments as needed. In this respect, an autonomous vehicle action may be based on an adaptive policy π that does not rely on active environment scanning and assessment, and instead focus on an action produced under an adaptive policy, which also is operable to take into consideration another vehicle.

Accordingly, at operation 610, a vehicular state is discerned relating to the another vehicle to produce a discerned vehicular state. At operation 612, an adaptive policy is formed for a present one of the set of autonomous vehicle states relative to the discerned vehicular state of the another vehicle. Generally, a policy π may be adapted by evaluation of the estimated reward against the reward attained with respect to the autonomous vehicle action.

For example, when the action is to increase acceleration based on reaching the subsequent autonomous vehicle state and based on the discerned vehicular state of the another vehicle, the estimated reward is to increase velocity by a certain amount and to increase a relative distance to the another vehicle at the subsequent autonomous vehicle state. If, for example, the expectations fall short (such as, for example, the another vehicle increased its respective velocity beyond that of the autonomous vehicle), subsequent actions are based on this feedback.

Also, as may be appreciated, the state interval sampling and/or assessments of the autonomous vehicle and those of the another vehicle may be staggered and/or interlaced to permit an informed decision on an autonomous vehicle action (such as an acceleration increase/decrease).

At operation 614, an autonomous vehicle action is formed based on the adaptive policy to progress to a subsequent one of the set of autonomous vehicle states of the vehicular objective. At operation 616, the autonomous vehicle action is transmitted for effecting a progression to the subsequent one of the set of autonomous vehicle states. For example, the autonomous vehicle action may be transmitted to other vehicle control units of the autonomous vehicle 100, such as a powertrain control unit. The powertrain control unit may operate to produce control data based on the autonomous vehicle action formed by the adaptive policy π, which is then provided to vehicle powertrain actuators.

At operation 618, when the subsequent one of the set of autonomous vehicle states is also the autonomous vehicle objective, the process 600 ends. Otherwise, the process 600 continues with a state progression of the set of autonomous vehicle states at operation 610.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

As one of ordinary skill in the art may appreciate, the term "substantially" or "approximately," as may be used herein, provides an industry-accepted tolerance to its corresponding term and/or relativity between items. Such relativity between items range from a difference of a few percent to magnitude differences.

As one of ordinary skill in the art may further appreciate, the term "coupled," as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of ordinary skill in the art will also appreciate, inferred coupling (that is, where one element is coupled to another element by inference) includes direct and indirect coupling between two elements in the same manner as "coupled."

As the term "module" is used in the description of the drawings, a module includes a functional block that is implemented in hardware, software, and/or firmware that performs one or more functions such as the processing of an input signal to produce an output signal. As used herein, a module may contain submodules that themselves are modules.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A method comprising:
for each state progression of a set of autonomous vehicle states related to an autonomous vehicle objective for a multi-vehicle environment:
discerning a vehicular state of another vehicle of the multi-vehicle environment to produce a discerned vehicular state of the another vehicle, wherein the another vehicle operates to affect the autonomous vehicle objective;
forming an adaptive policy to a present one of the set of autonomous vehicle states based on the discerned vehicular state;
producing from the adaptive policy an autonomous vehicle action to progress to a subsequent one of the set of autonomous vehicle states; and
transmitting the autonomous vehicle action for effecting a progression to the subsequent one of the set of autonomous vehicle states.

2. The method of claim 1, wherein the autonomous vehicle objective comprises at least one of:
merging from a merge lane with a traffic flow including the another vehicle;
merging from a present traffic lane to an adjacent traffic lane including the another vehicle; and
merging from an exit lane to a frontage lane including the another vehicle.

3. The method of claim 1, wherein the discerned vehicular state of the another vehicle comprises at least one of:
sensor input data relating to an operation of the another vehicle; and
data received from the another vehicle via a wireless communication.

4. The method of claim 1, wherein forming the adaptive policy includes:
optimizing, by one or more processors, at least one parameter of a vehicular policy to form the adaptive policy; and
generating, by the one or more processors, a reward prediction of the autonomous vehicle action based on the adaptive policy.

5. The method of claim 4, further comprises:
producing, by the one or more processors, feedback data relating to a reward parameter responsive to a vehicular action and passive dynamic data, and further modifying a policy parameter to form the adaptive policy; and
generating, by the one or more processors, a prediction of the autonomous vehicle action based on the adaptive policy generated from the passive dynamic data and vehicle control dynamic data.

6. The method of claim 5, wherein the feedback data includes temporal displacement error data.

7. The method of claim 1, wherein the vehicular state of the another vehicle being asynchronous to the present one of the set of autonomous vehicle states.

8. A method comprising:
selecting an autonomous vehicle objective for a vehicle environment;
identifying a set of autonomous vehicle states related to the autonomous vehicle objective;
determining whether another vehicle of the vehicle environment affects the autonomous vehicle objective;
when the another vehicle of the vehicle environment affects the autonomous vehicle objective, for each state progression of the set of autonomous vehicle states:
discerning a vehicular state of the another vehicle to produce a discerned vehicular state;
forming an adaptive policy to a present one of the set of autonomous vehicle states relative to the discerned vehicular state of the another vehicle;
forming an autonomous vehicle action based on the adaptive policy to progress to a subsequent one of the set of autonomous vehicle states of the autonomous vehicle objective; and
transmitting the autonomous vehicle action for effecting a progression to the subsequent one of the set of autonomous vehicle states.

9. The method of claim 8, wherein the autonomous vehicle objective comprises at least one of:
merging from a merge lane with a traffic flow including the another vehicle;
merging from a present traffic lane to an adjacent traffic lane including the another vehicle; and
merging from an exit lane to a frontage lane including the another vehicle.

10. The method of claim 8, wherein the discerned vehicular state of the another vehicle comprises at least one of:
sensor input data relating to an operation of the another vehicle; and
data received from the another vehicle via a wireless communication.

11. The method of claim 8, wherein forming the adaptive policy includes:
optimizing, by one or more processors, a vehicular policy to form the adaptive policy; and
generating, by the one or more processors, a prediction for the autonomous vehicle action based on the adaptive policy.

12. The method of claim 11, further comprises:
producing, by the one or more processors, feedback data relating to a reward parameter responsive to the autonomous vehicle action, and further modifying a policy parameter to form the adaptive policy; and
generating, by the one or more processors, the prediction of the autonomous vehicle action based on the adaptive policy.

13. The method of claim 12, wherein the feedback data includes temporal displacement error data.

14. The method of claim 8, wherein the vehicular state of the another vehicle being asynchronous to the present one of the set of autonomous vehicle states.

15. A vehicle control unit for autonomous vehicle operation in a multi-vehicle environment, the vehicle control unit comprising:
a wireless communication interface to service communication with a vehicle network;
a processor communicably coupled to the wireless communication interface and to a plurality of vehicle sensor devices; and
memory communicably coupled to the processor and storing, for each state progression of a set of autonomous vehicle states for an autonomous vehicle objective:
a multi-vehicle detection module including instructions that, when executed by the processor, cause the processor to:
based on a first portion of the plurality of vehicle sensor devices, discern a vehicular state of another vehicle of the multi-vehicle environment to produce a discerned vehicular state of the another vehicle, wherein the another vehicle operates to affect the autonomous vehicle objective;

a reinforcement learning module including instructions that, when executed by the processor, cause the processor to:

retrieve passive dynamic data for the autonomous vehicle operation relating the multi-vehicle environment related to a second portion of the plurality of the vehicle sensor devices;

form an adaptive policy, based on the discerned vehicular state and the passive dynamic data, to a present one of a plurality of autonomous vehicle states related to the autonomous vehicle objective;

form an autonomous vehicle action command from the adaptive policy to progress to a subsequent one of the set of autonomous vehicle states; and transmit the autonomous vehicle action command to effect a progression to the subsequent one of the autonomous vehicle states.

16. The vehicle control unit of claim 15, wherein the autonomous vehicle objective comprises at least one of:

merging from a merge lane with a traffic flow including the another vehicle;

merging from a present traffic lane to an adjacent traffic lane including the another vehicle; and merging from an exit lane to a frontage lane including the another vehicle.

17. The vehicle control unit of claim 15, wherein the discerned vehicular state of the another vehicle being based on at least one of:

sensor data of at least a portion of the plurality of vehicle sensor devices relating to an operation of the another vehicle; and data received from the another vehicle via a wireless interface.

18. The vehicle control unit of claim 15, wherein the reinforcement learning module further comprises:

a passive actor-critic module including instructions that, when executed by the processor, cause the processor to form the adaptive policy by:

optimizing a vehicular policy to form the adaptive policy; and generating a prediction for the autonomous vehicle action based on the adaptive policy.

19. The vehicle control unit of claim 18, wherein the passive actor-critic module further comprises:

an actor module including instructions that, when executed by the processor, cause the processor to generate the prediction of the autonomous vehicle action based on the adaptive policy; and a critic module including instructions that, when executed by the processor, cause the processor to produce feedback data for the actor module relating to a reward parameter responsive to a vehicular action, wherein the critic module, via the feedback data, and further operates to modify a policy parameter of the actor module to form the adaptive policy.

20. The vehicle control unit of claim 19, wherein the feedback data includes temporal displacement error data.

* * * * *

UNITED STATES PATENT AND TRADEMARK OFFICE
CERTIFICATE OF CORRECTION

PATENT NO. : 10,296,004 B2
APPLICATION NO. : 15/629004
DATED : May 21, 2019
INVENTOR(S) : Tomoki Nishi It is certified that error appears in the above-identified patent and that said Letters Patent is hereby corrected as shown below:

In the Specification

Column 4, Line 56: delete "134"

Signed and Sealed this
Fifth Day of November, 2019

Andrei Iancu
*Director of the United States Patent and Trademark Office*